Dec. 1, 1953  R. E. L. FELTER  2,661,050
REMOVABLE HEADREST FOR VEHICLES
Filed June 11, 1952

INVENTOR.
ROBERT E. L. FELTER
BY *Howard J. Whelan.*
ATTORNEY

Patented Dec. 1, 1953

2,661,050

UNITED STATES PATENT OFFICE 2,661,050

REMOVABLE HEADREST FOR VEHICLES

Robert E. L. Felter, Baltimore, Md.

Application June 11, 1952, Serial No. 292,809

5 Claims. (Cl. 155—174)

1

This invention relates to removable headrests and more particularly to those adaptable for attachment to the back rests of automobile seats.

The head rests usually attached to the backs of automobile seats are bulky and rigid in construction, and cannot be angularly tilted to suit the requirements of the user.

This invention has for an object the provision of a new and improved head rest to be attached to the backs of the front and rear automobile seats and positioned thereon without the use of tools.

It is a further object of this invention to provide a new and improved head rest for ready attachment to the back of an automobile seat that can be angularly adjusted to suit the requirements of the user.

It is a further object of this invention to provide a new and improved head rest for attachment to the top of the back rest of an automobile seat and be movable therewith.

Other objects will become apparent as the invention is more fully set forth.

For a clearer understanding of the invention and the objects thereof, reference is made to the accompanying drawings, wherein a particular form of the invention is indicated. These drawings when used in conjunction with the following description serve to illustrate the invention, its principles and the operation thereof, while the claims indicate its scope.

In the drawings.

Similar reference characters refer to similar parts throughout the drawings.

Figure 1:
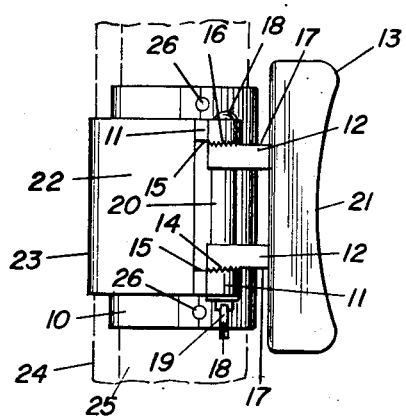
Figure 1 is a plan view of a headrest embodying this invention.

In the construction shown in the drawings a base plate 10 is provided with a bifurcated bracket 11 projecting upwardly and supporting a forked bracket 12 attached to the head rest 13. The upper ends of the bifurcated bracket 11 are provided with serrations 14 on their inner faces 15 that fit into similar serrations 16 on the outer faces 17 of the forked bracket 12. Holes are provided through the ends of the bifurcated bracket 11 and forked bracket 12 to receive a bolt 18 that passes through them to tighten the head rest in any selected position when the wing nut 19 is tightened thereon. A spacer 20 is positioned between the arms of the forked bracket 12 to pre-

Figure 2:
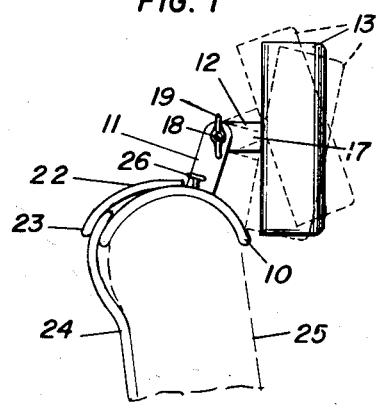
Figure 2 is a side elevation of Figure 1.
Figure 3:
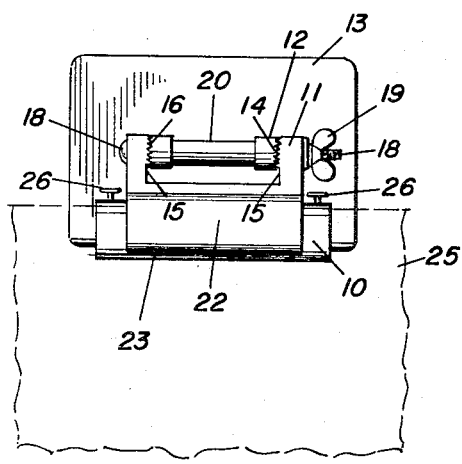
Figure 3 is a rear view of Figure 1.
Figure 4:
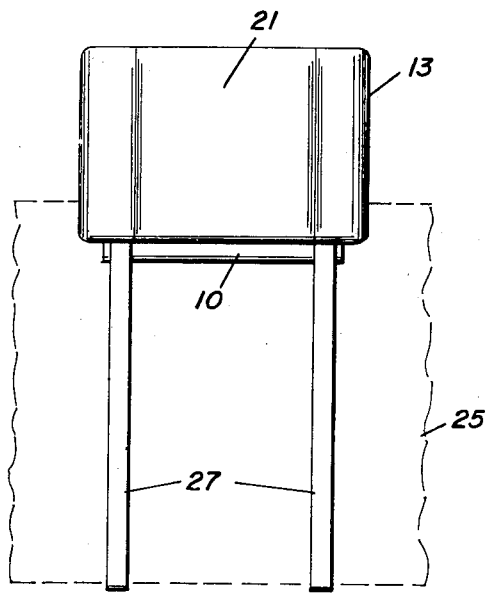
Figure 4 is a front view of the headrest attached to the seat by straps.
Figure 5:
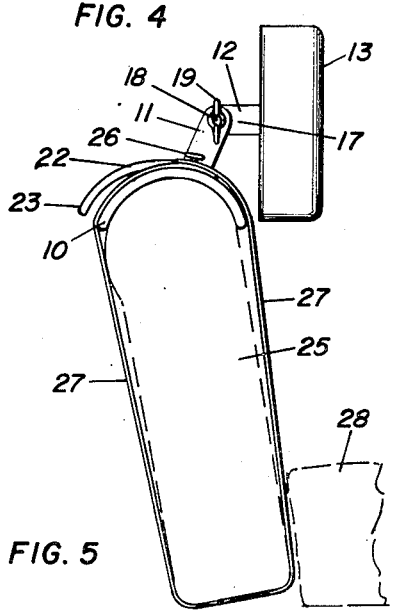
Figure 5 is a side elevation of Figure 4.

2 vent them from springing inwardly when the wing nut is tightened. The head rest 13 is preferably curved on its front face 21 to help in centering the head of the user thereon. The base plate 10 is provided with an ear 22 preferably welded at the rear of the bifurcated bracket 11 and has a raised portion 23 to slide over and bind on a thin plate or edge 24 integral with the seat back 25 as shown in the drawings. The base plate 10 is also provided with projections 26 to receive and hold straps 27 used in holding the head rest 13 on automobile seats 28 not provided with the plate or edge 24 shown in Figure 2 of the drawings.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. The combination of a head rest and a seat having a back edge, a base plate mounted on said back edge, said base plate having an ear projecting therefrom for removably attaching the base plate to said back edge, a bifurcated bracket mounted on said base plate, a forked bracket adjustably positioned on said bifurcated bracket, and a head rest mounted on said forked bracket and movable therewith.

2. The combination of a head rest and a seat having a back edge, a base plate mounted on said back edge, said base plate having an ear projecting therefrom for removably attaching the base plate to said back edge, a bifurcated bracket mounted on said base plate, a forked bracket adjustably positioned on said bifurcated bracket, a head rest mounted on said forked bracket and movable therewith, and means for tightening the bifurcated and forked brackets against rotation.

3. The combination of a head rest and a seat having a back edge, a base plate mounted on said back edge, said base plate having an ear projecting therefrom for removably attaching the base plate to said back edge, a bifurcated bracket mounted on said base plate, a forked bracket adjustably positioned on said bifurcated bracket, a head rest mounted on said forked bracket and movable therewith, means for tightening the bifurcated and forked brackets against rotation, and serrations provided in the walls of the bifurcated and forked brackets to hold the head rest in a predetermined position.

4. The combination of a head rest and a seat having a back rest, a base plate mounted on said back rest, said base plate having projections thereon, a bifurcated bracket mounted on said base plate, a forked bracket, a head rest attached to said forked bracket, fastening means attached to said projections to hold the head rest on said back rest, and means for tightening the bifurcated and forked brackets against rotation.

5. The combination of a head rest and a seat having a back rest, a base plate mounted on said back rest, said base plate having projections thereon, a bifurcated bracket mounted on said base plate, a forked bracket, a head rest attached to said forked bracket, fastening means attached to said projections to hold the head rest on said back rest, means for tightening the bifurcated and forked brackets against rotation, and serrations provided in the meeting walls of the bifurcated and forked brackets to hold the head rest in predetermined positions.

ROBERT E. L. FELTER.

References Cited in the file of this patent

UNITED STATES PATENTS

| Number | Name | Date |
| --- | --- | --- |
| 98,077 | Loveless | Dec. 21, 1869 |
| 98,250 | Goetchins | Dec. 28, 1869 |
| 497,697 | Wesson | May 16, 1893 |
| 2,490,088 | Penn | Dec. 6, 1949 |